Oct. 20, 1970 W. ANACKER ET AL 3,535,694
INFORMATION TRANSPOSING SYSTEM
Filed Jan. 15, 1968
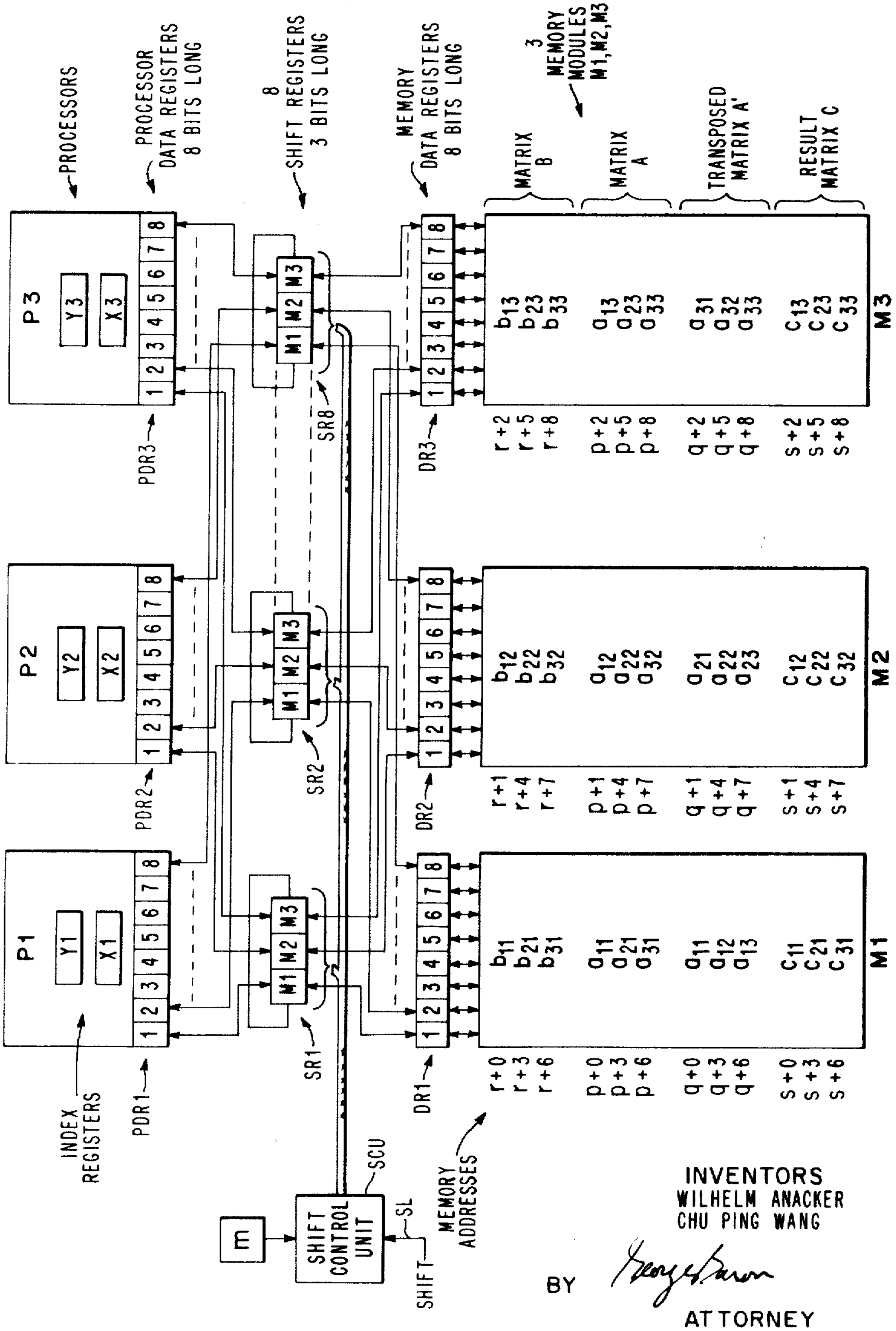
INVENTORS
WILHELM ANACKER
CHU PING WANG
BY [signature]
ATTORNEY United States Patent Office 3,535,694
Patented Oct. 20, 1970

3,535,694

INFORMATION TRANSPOSING SYSTEM

Wilhelm Anacker, Yorktown Heights, N.Y., and Chu Ping Wang, St. Louis, Mo., assignors to International Business Machines Corporation, Armonk, N.Y., a corporation of New York Filed Jan. 15, 1968, Ser. No. 697,767
Int. Cl. G06f 7/395
U.S. Cl. 340—172.5 1 Claim

ABSTRACT OF THE DISCLOSURE

A system is provided for expediting a matrix multiplying operation, i.e., a multiplication process in which all of the words of one matrix A are multiplied by all the words of another matrix B. This is accomplished by means of shift registers which keep transposing the words of one matrix between multiplying steps so that a plurality of processors have parallel access to the words of both matrices which are to be involved in the current multiplying operations. By the use of this technique, all of the processors are utilized at maximum efficiency, thereby minimizing the time required to perform matrix multiplication.

BACKGROUND OF THE INVENTION

Multiprograming and multiprocessing, or parallel data processing, are becoming increasingly desirable for future giant computers. Parallel data processing is relied upon to process large quantities of data, yet greatly reduce the time required for such processing.

Conventional digital computers operate on data that are represented in a horizontal configuration. Data to be operated upon are expressed in rows. A word could be comprised of 72 bits of information serially disposed in a row in the main memory of a computer, ranging from the most significant bit to the least significant bit, with the most significant bit at the left of the row and the least significant bit at the right of the row. When conventional computer techniques are used, the different binary digits (or bits) of a word are simultaneously transferred and operated upon with the different digits of another word. Thus a word or number including a horizontal row of digits is processed by combining (which will include any of the operations such as adding, subtracting, multiplication, etc.) it with another word or number including a similar horizontal row of digits.

Conventional data processing can be quite time consuming where a large amount of data are involved. Where a group of numbers is to be individually multiplied, for example, by individual numbers of another group of numbers, each multiplication process between two numbers of the groups requires a finite time. Obviously, if there is a large amount of data being processed, the time required to perform the multiplication may become prohibitively long for many types of computation.

In matrix problems, the matrix elements are stored by row in a random access memory. While simultaneous access to a column of elements is possible if every row is placed in a separate memory module, the access to a row is restricted to one element at a time. When one multiplies the product of two matrices, each of dimension R, a total of $R^3$ multiplications must be performed in sequential steps. The matrix multiplication problem can be speeded up by performing a number of multiplications in parallel, using parallel processors. However, in order to perform such parallel multiplication, it is essential that the matrix elements be accessible in parallel by row as well as by coumn. This invention is directed to a scheme for transposing the stored matrix elements at high speed even though the stored matrix elements are initially stored in a random access memory by row or by column.

Techniques for attaining information transformation are well known in the prior art. U.S. Pat. No. 3,258,584 to Bucholz et al. and U.S. Pat. No. 3,217,317 to Kliman are examples of such prior art information transposition devices for core memories, but they all require an elaborate wiring scheme for switching the core in their respective memories to achieve information transposition. In other words, special hardware must be provided inside of a conventional core memory in order to implement the transformation process.

The invention to be described hereinafter achieves information transformation without requiring any elaborate or extensive rewiring of large scale memories. Such transformation or transposition is accomplished by means of shift registers which can be placed outside of the memory modules. A set of $r$ shift registers is used, where $r$ is the number of bits in a word whose location in memory is to be transposed. Each shift register is $s$ bits in length, where $s$ is the number of memory modules that are connected to the shift registers. The shift registers may be chosen so that each is capable of right and left shifts, and they are closed loop registers, that is, a shift out of the last bit from the register goes into the first bit for shifts to the right and vice versa for left shifts. All corresponding first bits of each word in the $s$ memory modules are connected to be stored in the first shift register, all corresponding second bits of each word in the $s$ memory modules are connected to be stored in the second shift register, etc. After the bits are stored in the shift registers from the memory modules, a simultaneous shift of one bit to the right or left, the shifted words are transferred back to the memory modules. Since the words stored in the memory modules are randomly accessed, the words participating in the shift operation could belong to different rows in the data array. Such word shift operation achieves, in a manner to be described hereinafter in greater detail, high speed matrix transposition.

The foregoing and other objects, features and advantages of the invention will be apparent from the following more particular description of a preferred embodiment of the invention, as illustrated in the accompanying drawings.

BRIEF DESCRIPTION OF THE DRAWINGS

The sole figure is a schematic illustration of the invention in block form setting out the relationship of the memory modules to the shift registers to achieve information transposition and parellel processing wherein the example used to illustrate the invention comprises 3 processors, 3 memory modules, and 8 shift registers, each 3 bits long.

DESCRIPTION OF THE PREFERRED EMBODIMENT

For the purpose of illustrating the construction and operation of the invention, there is shown in the sole figure memory modules M1, M2 and M3. Although any number of memory modules storing any number of words by column, within practical limits, can be used, a 3 x 3 matrix is chosen to demonstrate the transposition of a row of words stored in three memory modules into a column stored in a single memory module. Each word in the memory modules is chosen to be eight bits long so that eight shift registers are needed to illustrate the transposition process. Each memory module M1, M2 and M3 has associated therewith a data register DR1, DR2, DR3, respectively. As seen in the figure, the first significant bit of DR1 is connected to first shift register SR1, in location M1; the first significant bit of DR2 is connected to SR1 at location M2; and the first significant bit of DR3 is connected to SR1 at location M3. In a similar manner, all corresponding second significant bits of data registers DR1, DR2 and DR3 are connected to their respective positions M1, M2 and DR3 in shift register SR2, such connections continuing until the eighth shift register SR8 is connected to the corresponding eighth significant bits of data registers DR1, DR2 and DR3.

Three processors P1, P2 and P3 are shown and they are conventional data processors capable of performing multiplication, division, addition, subtraction, and many other operations on data fed to them, and also capable of yielding results due to such processing. Each processor P1, P2 and P3 has its corresponding data register PDR1, PDR2 and PDR3 and each such data register is capable of storing, like the memory data registers DR1, DR2, etc., eight bits of data. Each processor data register is connected to shift registers SR1, SR2 and SR3 in the same manner as the memory data registers. Each processor P1, P2, etc., has index registers X and Y wherein $X_1$, $Y_1$ are the index registers of processor P1; $X_2$ and $Y_2$ are the index registers for processor P2 and $X_3$ and $Y_3$ are the index registers for processor P3.

A shift control unit SCU applies shifting pulses to all shift registers SR simultaneously in response to signals coming on shift line SL. A counter $m$ is also connected to the shift unit SCU and signals from said counter, when applied to the latter, determine how many positions to the left each shift register SR will shift.

Each memory module M1, M2 and M3 is loaded with words and their addresses are shown as $r+0$, $r+1$, . . . $r+8$, $p+0$, $p+1$, . . . wherein $r$ and $p$ are arbitrarily chosen base or starting addresses for the words in the modules.

Priod to illustrating the manner in which shift registers are used to perform the matrix transposition function, it would aid in understanding the invention if one were to consider the manner in which one attains the product of matrix A by matrix B. According to the rule of matrix multiplication, $$C_{ij}=\sum_{k=1}^{n} A_{ik}B_{kj}$$

The matrix product will be expanded on the assumption that matrix A is composed of 3 x 3 words, matrix B is composed of 3 x 3 words, and matrix C houses the results of the multiplication. Rows of words are designated by the subscript $i$ and columns are designated by the subscript $j$.

If the matrix C were expanded, there would be nine products $c_{11}$ to $c_{33}$ wherein $$c_{11}=a_{11}b_{11}+a_{12}b_{21}+a_{13}b_{31}$$
$$c_{12}=a_{11}b_{12}+a_{12}b_{22}+a_{13}b_{32}$$
$$c_{13}=a_{11}b_{13}+a_{12}b_{23}+a_{13}b_{33}$$
$$c_{21}=a_{21}b_{11}+a_{22}b_{21}+a_{23}b_{31}$$
$$c_{22}=a_{21}b_{12}+a_{22}b_{22}+a_{23}b_{32}$$
$$c_{23}=a_{21}b_{13}+a_{22}b_{23}+a_{23}b_{33}$$
$$c_{31}=a_{31}b_{11}+a_{32}b_{21}+a_{33}b_{31}$$
$$c_{32}=a_{31}b_{12}+a_{32}b_{22}+a_{33}b_{32}$$
$$c_{33}=a_{31}b_{13}+a_{32}b_{23}+a_{33}b_{33}$$

As seen in the sole figure, matrix B is stored as words $b_{11}$, $b_{12}$ . . . $b_{33}$ in the three memory modules M1, M2 and M3 in particular memory addresses $r+0$, $r+1$, $r+2$ . . . to $r+8$ where r is an arbitrary base address. Matrix A has all its words stored in memory modules M1, M2 and M3 at memory addresses $p+0$, $p+1$, $p+2$ . . . $p+8$ where $p$ is an arbitrary base address. Since a product such as $c_{11}$ is equal to $a_{11}b_{11}+a_{12}b_{21}+a_{13}b_{31}$, it is desirable for attaining the benefits of multiprocessing that the first processor P1 should get all its information or data from the first memory module M1, the second processor P2 should get all its data from the second memory module M2 and in a similar manner the third processor P3 should obtain its data from memory module M3 so that all processors P1, P2 and P3 can be processing data simultaneously to obtain a product such as $c_{11}$, $c_{12}$, $c_{13}$ . . . $c_{33}$. It is seen that unless matrix A is transposed, the product $c_{11}$, for example, cannot be obtained by multiprocessing in that the words in locations $p+0$, $p+1$, . . . $p+8$ do not lie in their respective memory modules so that words $a_{11}$ and $b_{11}$ are in one memory module, $a_{12}$ and $b_{21}$ are in a second memory module and $a_{13}$ and $b_{31}$ are in a third memory module. Consequently, the information contained in matrix A and stored in the various memory modules must be transposed to permit the above noted multiprocessing. To achieve transposition of matrix A, the following algorithm is relied upon:

Step:

1—Set counter $m=0$
2—Set counter $k=0$
3—Set index register $y_1=0$; $y_2=(n+1)$; $y_3=2(n+1)$
4—Set index register $x_1=0$; $x_2=(n+1)$; $x_3=2(n+1)$
5—Read $\langle p+x_1\rangle$ mod $n^2$; $\langle p+x_2\rangle$ mod $n^2$; $\langle p+x_3\rangle$ mod $n^2$
6—Shift $m$ units to the left
7—*Write* $\langle q+y_1\rangle$ mod $n^2$; $\langle q+y_2\rangle$ mod $n^2$; $\langle q+y_3\rangle$ mod $n^2$
8—Increment $m$ by 1
9—Increment $y$ by $n$
10—Diminish $x$ by $n$
11—Diminish $k$ by 1
12—Go to step 5 if $k>0$ and repeat.

In the algorithm set out above, $k$ is introduced as a program counter that exists in the processors P1, P2 and P3 and is not shown, it being conventional in programing

| | Matrix A | | | | Matrix B | | | | Matrix C | | |
|---|---|---|---|---|---|---|---|---|---|---|---|
| | j=1 | j=2 | j=3 | | | | | | | | |
| i=1 | $a_{11}$ | $a_{12}$ | $a_{13}$ | | $b_{11}$ | $b_{12}$ | $b_{13}$ | | $c_{11}$ | $c_{12}$ | $c_{13}$ |
| i=2 | $a_{21}$ | $a_{22}$ | $a_{23}$ | x | $b_{21}$ | $b_{22}$ | $b_{23}$ | = | $c_{21}$ | $c_{22}$ | $c_{23}$ |
| i=3 | $a_{31}$ | $a_{32}$ | $a_{33}$ | | $b_{31}$ | $b_{32}$ | $b_{33}$ | | $c_{31}$ | $c_{32}$ | $c_{33}$ |

computer steps that a counter be used to keep track of such steps. Also, the expression mod $n^2$ would be an abbreviation for "modulo 9" in that the rank $n$ of the matrix is 3 in the chosen example. Thus, for a sequence of numbers 0, 1, 2, 3, 4, 5, 6, 7, 8, represented in modulo 9, the numbers −9, 9, 18 are equivalent to 0; −8, 10, 19 are equivalent to 1; −7, 11, 20 are equivalent to 2, . . . etc.

To effect the matrix transposition, counter $m$ is set to 0, counter $k$ (not shown) is set to 3 (since the rank $n$ of the matrix =3), index register $y_1$ and $x_1$ of processor P1 are each set to 0, index registers $y_2$ and $x_2$ of processor P2 are each set to $(n+1)$ or 4 and index registers $y_3$ and $x_3$ of processor P3 are each set to 8, the value of $2(n+1)$ where $n=3$.

Step 5 of the algorithm calls for the simultaneous reading out of memory the words located at the addresses $<p+x_1>$ mod 9, $<p+x_2>$ mod 9 and $<p+x_3>$ mod 9, and placing them in their respective shift registers SR1, SR2 . . . SR8. Since $x_1=0$, $x_2=4$, and $x_3=8$, the respective addresses are $p+0$, $p+4$, and $p+8$; and such addresses correspond to the element $a_{11}$, $a_{22}$ and $a_{33}$ of matrix A.

Step 6 requires that the contents of the shift registers be shifted $m$ times to the left. However, $m=0$, so no shift takes place.

In step 7, the contents of the shift registers are written back into the memory modules via data registers DR1, DR2 and DR3 at locations $<q+y_1>$ mod $n^2$, $<q+y_2>$ mod $n^2$ and $<q+y_3>$mod $n^2$. Since $y_1=0$, $y_2=4$, $y_3=8$, the new locations $a_{11}$, $a_{22}$ and $a_{33}$ are $q+0$, $q+4$, and $q+8$, where $q$ is an arbitrary base address in the memory modules different from $p$.

By following the instruction steps 8 to 12 of the algorithm, $m$ becomes equal to 1, $y$ is increased by 3, $x$ is decreased by 3 and $k$ is now equal to 2 having been diminished by 1. Since $k>0$, the memory modules M1, M2 and M3 are read out in accordance with the instruction set out in step 5. Thus, in step 5, the new conditions are Read$<p-3>$mod 9, $<p+1>$mod 9 and $<p+5>$mod 9. Since $<p-3>$mod $9\equiv<p+6>$, then locations $<p+6>$, $<p+1>$ and $<p+5>$ are placed into the shift registers, such locations storing words $a_{31}$, $a_{12}$ and $a_{23}$. Since $m=1$, shift control unit SCU actuates all shift registers to shift their contents once to the left. The new locations for the shifted words are $<q+3>$mod 9, $<q+7>$mod 9 and $$<q+11>\text{mod } 9$$

the latter being $\equiv<q+2>$. Thus the new locations for words $a_{31}$, $a_{12}$ and $a_{23}$ are $a_{12}$ at $<q+3>$, $a_{23}$ at $<q+7>$ and $a_{31}$ at $<q+2>$ After the second write step, $m=2$, $y$ has increased by 3 and is now +6 and $x$ has diminished by 3 and is now −6 and $k=1$. Since $k$ *is* >0, the algorithm requires a return to step 5 where the words located at the following addresses are read into shift registers SR1, SR2 . . . SR8, namely, $<p-6>$mod 9, $<p-2>$mod 9 and $<p+2>$mod 9. Since $<p-6>$mod $9\equiv<p+3>$ and $<p-2>$mod $9\equiv<p+7>$, then the words $a_{21}$, $a_{32}$ and $a_{13}$ corresponding to addresses $p+3$, $p+7$, and $p+2$ are read into the shift registers and are shifted twice to the left. In accordance with step 7, the new locations of the twice shifted words are $<q_1+6>$mod 9, $$<q_1+10>\text{mod } 9\equiv<q+1>$$

and $<q_1+14>$mod $9\equiv<q_1+5>$. The new locations for $a_{13}$, $a_{21}$ and $a_{32}$ are respectively $q+6$, $q+1$ and $q+5$. Since step 11 of the algorithm shows $k$ now to be equal to 0, the transposition of matrix A has been completed and it is seen by comparing $p$-addresses with $q$-addresses that rows of words in three separate memory modules have been transposed into columns of words into individual memory modules.

In summary, for a matrix having the rank of 3, the transposition of matrix A takes place in the following manner:

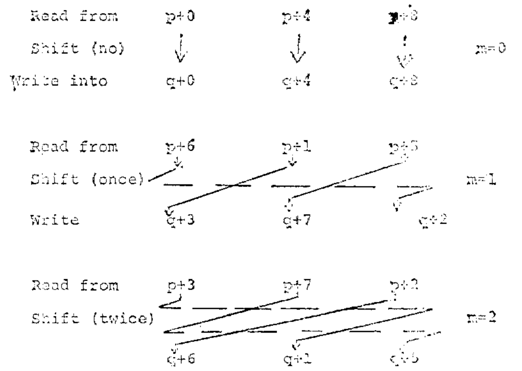

An algorithm, well within the skill of programers working in the computer art, can be written setting out the steps needed to perform the parallel multiplication of words now stored, by the transposition procedure described above, in a single memory module.

For example, parallel multiplication takes place in the following steps by multiplying and adding the contents of one memory module M1 at the same time that such multiplication and addition is taking place in other modules M2 and M3:

| | | | |
|---|---|---|---|
| Step I | $r+0$ | $r+4$ | $r+8$ |
| | $x$ | $x$ | $x$ |
| | $q+0$ | $q+4$ | $q+8$ |
| | + | + | + |
| | $r+3$ | $r+7$ | $r+2$ |
| | $x$ | $x$ | $x$ |
| | $q+3$ | $q+7$ | $q+2$ |
| | + | + | + |
| | $r+6$ | $r+1$ | $r+5$ |
| | $x$ | $x$ | $x$ |
| | $q+6$ | $q+1$ | $q+5$ |
| | ‖ | ‖ | ‖ |
| | $s+0$ | $s+4$ | $s+8$ |

NOTE.—Where $m=0$; $x=0$; and $y=0$, 3 and 6.

Since the matrix product $c_{11}=a_{11}b_{11}+a_{12}b_{21}+a_{13}b_{31}$, it is seen that all the terms of the product $c_{11}$ are stored in memory module M1 and the result is stored in another location in module M1, i.e., $s+0$ where $s$ is an arbitrary base address. Likewise, memory module M2 is now storing all the terms needed to obtain a matrix product $c_{22}$ and such product is stored in the same memory module M2 at location $s+4$. Similarly, all the elements of the product $c_{33}$ lie in memory module M3 and the result $c_{33}$ is stored in address $s+8$.

To attain the products $c_{21}$, $c_{32}$ and $c_{13}$, the contents of the transposed matrix A′ must be shifted one position to the left so that columns of words are available simultaneously in parallel to processors P1, P2 and P3. A chart showing such shifting follows:

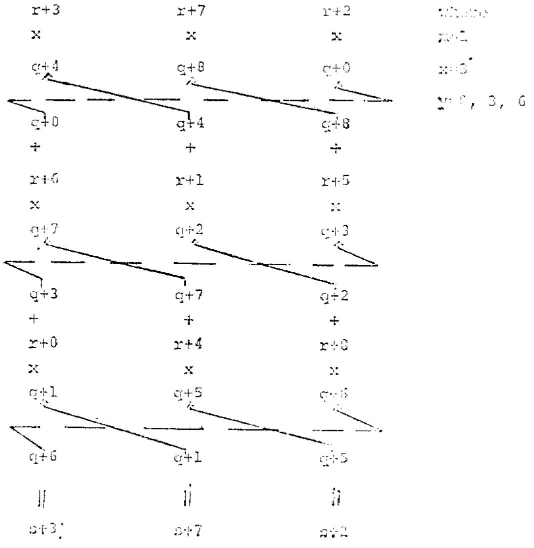

By such single shift of the transposed matrix A′, one obtains the products $c_{21}$, $c_{32}$ and $c_{13}$ in that all the terms for obtaining $c_{21}$ are in module M1, all the terms for obtaining $c_{32}$ are in module M2 and all the terms for obtaining $c_{13}$ are in module M3.

In a similar fashion, where $m$ is equal to 2, $x=6$ and $y=0$, 3, and 6, by shifting the transposed matrix A′ two modules to the left, all the terms needed to obtain product $c_{31}$ are in memory module M1, all the terms needed to obtain product $c_{12}$ are in memory module M2, and all the terms needed to obtain product $c_{23}$ are in memory module M3, so that all processors P1, P2 and P3 can simultaneously multiply and add terms that lie in memory modules M1, M2 and M3, respectively, to produce products $c_{31}$, $c_{12}$ and $c_{23}$. Although it is not necessary to do so, for convenience, the resulting matrix C is stored in addresses $s+0$, $s+1$ . . . $s+8$ in the memory modules M1, M2 and M3.

Of course, a 3 x 3 matrix was chosen to simplify the description of the invention. Obviously, by merely changing the programming steps, the ranks of the matrices and the number of memory modules and processors used can be greatly increased in number. However, the data registers will be connected to the shift registers in the same manner set forth, namely, all corresponding significant bits in a data register will be connected to a shift register, a separate shift register being used for each bit in a memory word, and there being as many bits in a shift register as there are memory modules. It is also understood that the invention can be employed to transpose columns of words appearing in separate memory modules into a single row of words appearing in one memory module as well as to transpose rows of words appearing in separate memory modules into a single column of words.

The invention is particularly valuable, especially where large matrices are to be multiplied, in that the speed of performing such multiplication is greatly increased. In general, the speed of processing a matrix $n$ by conventional memory accesses is of the order of $(n^3+n^2)$ times the memory cycle time whereas with shift registers employed in the manner set forth herein, the time is of the order of $2n^2+2n+Kt_{sr}$, where $t_{sr}$ is the switching time of the shift register and K is a constant denoting the number of shift operations. For large values of $n$, the saving in time is considerable.

Finally, it should be noted ordinary random access memories are used, and no changes need be made in their internal hardware to achieve such higher multiplication speeds. Such higher speeds are attained at the cost of shift registers, which cost is negligible compared to present schemes for attaining information transposition.

The type of basic operating memory modules M1,

M2, M3, shift registers SR, data registers DR, processors P1, etc., are immaterial to the practice of the invention. The various logic circuits, read/write circuits, and counters are conventional and are of the kind shown in Bucholz et al. Pat. No. 3,258,584 or in the Unger Pat. No. 3,106,698. All the circuitry of such patents is incorporated by reference herein so that the gist of the invention is not obscured, namely, the use of shift registers, in conjunction with a plurality of memory modules, to effect information transformation in memory modules, allowing for more rapid parallel processing of such information, yet not require any change in the existing structure of basic operating memory modules.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an information transposing system comprising $s$ basic memory modules, each of said modules storing words that are each $r$ bits long, $r$ shift registers, each of which has $s$ stages, and means connecting the first stage of the first shift register to the first bit position of the first memory module, the second stage of the first shift register to the first bit position of the second memory module, . . . and the $s^{th}$ stage of the first shift register to the first bit position of the $s^{th}$ memory module; the first stage of the second shift register to the second bit position of the first memory module, the second stage of the second shift register to the second bit position of the second memory module, . . . and the $s^{th}$ stage of the second shift register to the second bit position of the $s^{th}$ memory module, said connecting means maintaining the above noted order of interconnecting the $r$ shift registers and words from the $s$ memory modules until the $s^{th}$ stage of the $r^{th}$ shift register is connected to the $r^{th}$ bit position of the $s^{th}$ memory module.

References Cited

UNITED STATES PATENTS

| | | | |
|---|---|---|---|
| 3,243,786 | 3/1966 | Davies | 340—172.5 |
| 3,277,449 | 10/1966 | Shooman | 340—172.5 |
| 3,411,139 | 11/1968 | Lynch et al. | 340—172.5 |

PAUL J. HENON, Primary Examiner

M. E. NUSBAUM, Assistant Examiner

U.S. Cl. X.R.

235—164